F. S. DENISON.
THERMOSTATIC SWITCH.
APPLICATION FILED MAR. 26, 1917.

1,390,987.

Patented Sept. 20, 1921.

WITNESSES

INVENTOR
FREDERICK S. DENISON

BY
ATTORNEYS

UNITED STATES PATENT OFFICE.

FREDERICK S. DENISON, OF MINNEAPOLIS, MINNESOTA, ASSIGNOR TO MINNEAPOLIS HEAT REGULATOR COMPANY, OF MINNEAPOLIS, MINNESOTA, A CORPORATION.

THERMOSTATIC SWITCH.

1,390,987.  Specification of Letters Patent.  Patented Sept. 20, 1921.

Application filed March 26, 1917. Serial No. 157,309.

*To all whom it may concern:*

Be it known that I, FREDERICK S. DENISON, a citizen of the United States, resident of Minneapolis, county of Hennepin, State of Minnesota, have invented certain new and useful Improvements in Thermostatic Switches, of which the following is a specification.

In the operation of ovens and the like, heated by electricity, it is desirable to provide some means for shutting off the current when the temperature reaches a predetermined degree and turning it on again when the temperature falls below such degree. It has been found difficult to control the heating medium through the agency of an ordinary thermostat for the reason that as the thermostatic bar moves slowly from the contact point or toward it, the high tension electric current will form an arc and soon burn out or damage the contact points.

The object, therefore, of my invention is to provide a thermostatic bar of such construction that the initial movement in breaking the contact and the final movement in making the contact will be rapid, thereby preventing arcing between the points.

The invention consists generally in various constructions and combinations, all as hereinafter described and particularly pointed out in the claims.

Figure 1:
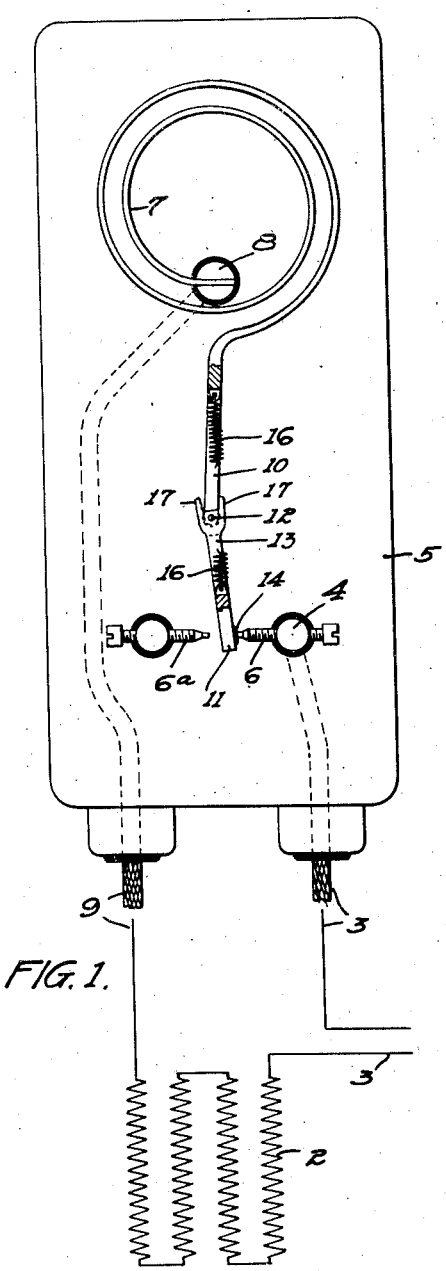
Figure 2:
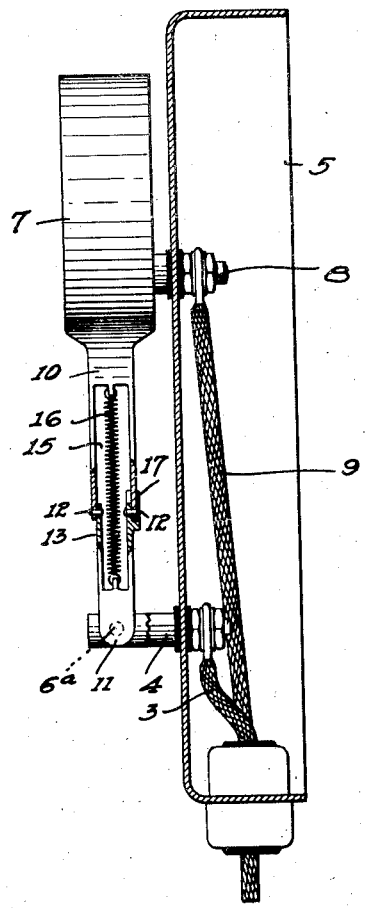
Figure 3:
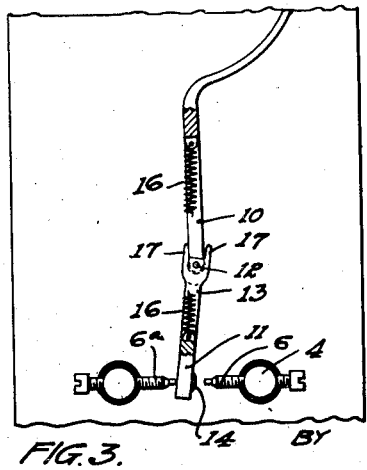

In the accompanying drawings forming part of this specification,

Figure 1 is a front elevation, partially in section, of a thermostatic switch embodying my invention, Fig. 2 is a sectional view of the same, Fig. 3 is a detail sectional view of the lower portion of the thermostatic bar.

In the drawing, 2 represents a suitable heating member, having a conductor 3 leading through a source of electrical energy to a contact post 4 mounted on a base 5 and having a contact screw 6 therein. A similar screw 6ª is mounted in opposing relation to the screw 6 to form a stop for the thermostatic bar. This bar comprises a coil 7 mounted on a post 8 and in circuit with the heating member through a conductor 9. The coil 7 has a depending portion 10 and a tongue 11 is pivoted at 12 and has a forked end 13 which is straddled by the lower end of the member 10. The tongue 11 has a contact surface 14 for engaging the screw point 6. The depending end 10 and the tongue 11 are preferably provided with a longitudinal slot 15 and a helical spring 16 is arranged within said slot and has its ends connected to the member 10 and to the tongue 11. The tongue has fingers 17 thereon which straddle the lower end of the bar 10 and prevent the member 10 and the end 13 from moving out of their proper relative position in the operation of the device. The oscillation of the thermostatic bar will utilize the tension of the spring to quicken the movement of the tongue 11. To illustrate: Assuming that the thermostatic bar is in the position shown in Fig. 1 and the temperature changes sufficiently to cause oscillation of the end 10 toward the right, holding the contact 14 against the contact screw 6. When the joint 12 becomes straightened and the spring 16 passes the dead center, it will snap the tongue 11 away from the contact screw 6 and against the other screw 6ª, as shown in Fig. 3. This quick movement of the tongue 11 from one contact screw to the other will prevent sparking and burning out or damaging the contact points.

I do not wish to be confined to the particular construction of the thermostatic bar or the manner of mounting the circuit closing tongue thereon, as these details may be modified, my invention consisting primarily in the means for imparting a quick movement to the tongue as it leaves its contact point or approaches it, and thereby avoid danger of the current jumping from one to the other.

I claim as my invention:

1. A thermostatic switch comprising a bar having a forked end, a tongue having a forked end, the arms of said tongue being pivotally connected with the arms of the fork of said bar, contacts mounted upon opposite sides of said tongue and a coiled spring arranged between the arms of the forks of said bar and tongue and bridging the pivotal connection between said tongue and bar, movement of said bar holding said tongue against one of said contacts until said spring passes the pivotal connection between said tongue and bar and the power of the spring is exerted to move said tongue to the other contact.

2. A device of the class described comprising a thermostatic bar having a bifurcated end, a tongue having a bifurcated end pivotally connected with said bar, contact points provided upon opposite sides of said tongue and a spring having its ends connected respectively with said bar and tongue and bridging the joint between them for quickening the movement of said tongue away from one of said contact points when said spring is moved past the pivotal connection of said bar and tongue.

3. A device of the class described comprising a thermostatic bar, a tongue pivoted at one end of said bar and having fingers straddling said bar to limit the degree of their relative movement, contact points between which said tongue is movable, and a spring mounted on said bar and tongue and bridging the pivotal connection between them and adapted to move said tongue quickly away from one of said contact points when said spring is moved past the center of the pivotal connection between said tongue and bar through the oscillation of said bar.

4. A device of the class described comprising a thermostatic bar, a tongue pivoted at one end of said bar, contact points between which said tongue is movable and a spring mounted on said bar and tongue and bridging the pivot of said tongue and adapted to move said tongue quickly away from one of said contact points when said spring is moved past the center of the pivot of said tongue through the oscillation of said bar.

In witness whereof, I have hereunto set my hand this 21st day of March, 1917.

FREDERICK S. DENISON.